(No Model.)
S. H. ATCHISON.
AUTOMATIC STEAM BEER GOVERNOR AND PRESSURE REGULATOR.
No. 606,113. Patented June 21, 1898.
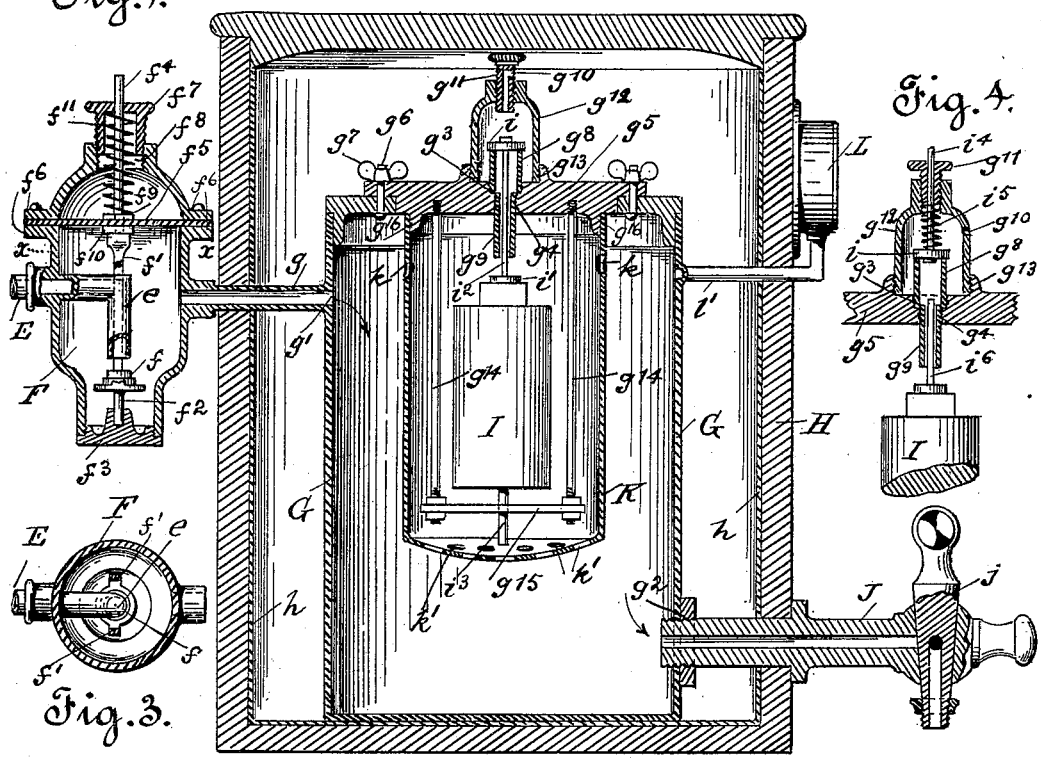
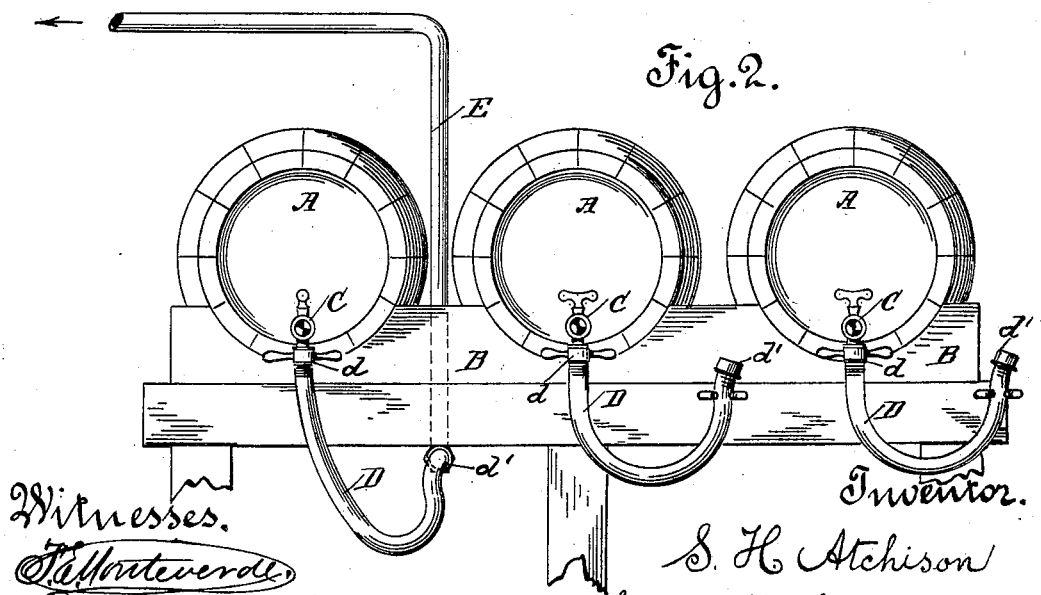
Witnesses.
T. Monteverde
Dan'l Callaghan
Inventor.
S. H. Atchison
by A. H. St. Marie
atty

UNITED STATES PATENT OFFICE.

SAMUEL H. ATCHISON, OF SAN FRANCISCO, CALIFORNIA.

AUTOMATIC STEAM-BEER GOVERNOR AND PRESSURE-REGULATOR.

SPECIFICATION forming part of Letters Patent No. 606,113, dated June 21, 1898.

Application filed May 4, 1896. Serial No. 590,226. (No model.)

*To all whom it may concern:*

Be it known that I, SAMUEL H. ATCHISON, a citizen of the United States, and a resident of the city and county of San Francisco, State of California, have invented certain new and useful Improvements in Automatic Steam-Beer Governors and Pressure-Regulators; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to devices used for drawing steam-beer from a barrel into a glass for immediate consumption; and the object thereof is to provide an improved apparatus by means of which beer of this kind may be drawn quickly and under any pressure without venting the barrel in which it is contained.

The word "steam-beer" is here used to designate a variety of beer produced and consumed to a large extent in the State of California and other commonwealths of the Pacific coast. This beer is made at all seasons of the year and is brewed for immediate use. It is somewhat allied to lager-beer, but differs from the latter kind chiefly in that it evolves an enormous quantity of gas, part of which must be liberated before the beer generating it can be drawn, whereas lager-beer, on the contrary, has not life enough of its own and must be foamed—that is, charged with air soon after tapping the keg or barrel which contains it—in order to render it potable. Hence the necessity of following a very different process in drawing these two kinds of malt liquor, one having a great natural power of effervescence, while the other is lacking in this respect. It is estimated that the average pressure in a barrel of steam-beer amounts to eighty pounds per square inch, and often reaches as high as one hundred and ten pounds. Were such beer drawn in the same way as lager, nothing but froth could be had. The practice has therefore obtained where steam-beer is retailed to first vent or "steam" the barrel containing the same before dispensing it, the beer being afterward drawn directly from the barrel through a faucet, the plug of which is raised instead of being turned in order to break the force of the flow. The venting, if resorted to freely, liberates the beer-gas and lessens its pressure, so that the liquid can be had without trouble; but only one-half of it can be said to come out of the barrel in a state at all fit to be drank, the remainder becoming flat and unsalable to a connoisseur. If, on the other hand, the venting be done sparingly, there is so much foam coming out of the drawing-off faucet that it becomes a very tedious matter and involves a great loss of time and labor to draw even such a small quantity as a glassful of beer. Even then the beer loses its strength gradually as the gas is let out at the faucet, and the barrel is no sooner half-emptied than its contents become lifeless and unpalatable. In either case, besides, the last glassful cannot be had out of the barrel, as there is not enough pressure at the bottom to cause the beer to run out of the faucet. Realizing these difficulties it has been my aim to devise an apparatus that would operate substantially as follows, first, to run out the steam-beer from the barrel into a suitable fount in small quantities at a time, such as may be needed for immediate use, without venting or "steaming," thereby keeping a full head of gas inside the barrel and the beer therein in its liveliest condition; second, to break the pressure on the beer thus drawn outside the barrel and only as the same is required for consumption; third, to automatically vent the fount and maintain the pressure at a given rate therein, and, fourth, to preserve the beer in the fount at a low degree of temperature, so it may be had therefrom in the best possible shape—that is to say, neither too flat nor too foamy, but clear, cool, and sharp. The result of my efforts in this direction has been the invention disclosed herein.

Referring now to the drawings hereto annexed, Figure 1 is a sectional elevation of the improved apparatus devised by me. Fig. 2 is a front elevation showing a row of steam-beer barrels placed on a rack ready to be connected with the said apparatus. Fig. 3 is a horizontal section on the line $x\,x$ of Fig. 1, looking downward; and Fig. 4 is a broken sectional elevation of a small part of the apparatus representing a modification thereof.

The letter A represents steam-beer barrels, which are usually placed several in a row upon a rack B, located at any suitable spot about the room where the beer is to be dispensed—for instance, in a cellar underneath or in some corner on the room-floor, as may be found convenient. These barrels are allowed to remain twenty-four hours or so on the rack before they are tapped in order to give time to the yeast which the beer contains to settle below the level of the faucet C, with which each barrel is furnished. No vent-holes need be provided in the barrels, as the like are not to be used; but the beer having sufficiently settled it is run directly from any of the barrels into the governor and regulator, without venting or steaming, through a flexible pipe D, which has suitable couplings $d\ d'$ for connection with either of the faucets C, and a metallic pipe E, leading into the governing and regulating apparatus. This apparatus consists, first, of a casing F, provided with a cut-off valve where the pipe E discharges, and, second, of a fount G, inclosed within a case or an ice-chest H and having a vent-hole automatically controlled by a float I and suitable valves $i\ i'$. The beer is drawn into the glass or pitcher through a faucet J after passing through the casing F and fount G. The pipe E is brought up to one side of the casing F and coupled with an elbow $e$, discharging into the bottom thereof. Below the discharge end of the elbow-pipe $e$ is a valve $f$, carried by a yoke or stirrup $f'$, having a pin $f^2$, that supports it in a suitable socket formed in a screw-plug $f^3$ in the bottom of the casing. The yoke $f'$ has at its upper end a stem $f^4$, that passes through a flexible or movable diaphragm $f^5$, laid across the casing and preferably secured between outward flanges $f^6$ of the same. From the diaphragm $f^5$ the stem $f^4$ runs upward through a tubular screw-cap $f^7$, engaging a screw-threaded opening $f^8$ in the upper part of the casing F. The stem is secured to the center of the diaphragm by means of nuts or plates $f^9\ f^{10}$, and is thus adapted to act in concert with said diaphragm and partake of the latter's movements, together with the yoke and valve carried thereby. A spiral spring $f^{11}$, coiled around the stem $f^4$ and set between the cap $f^7$ and the upper plate $f^9$, determines the resistance that has to be overcome before the diaphragm and parts thereto connected are allowed to rise. This spring, it will be understood, offers more or less resistance, according to the way the screw-cap is turned. If the cap be screwed down, the spring will be compressed and bear proportionately upon the diaphragm through the upper plate $f^9$. If the cap be screwed up or unscrewed, the spring will be relaxed and the pressure on the diaphragm reduced accordingly. Whatever is the pressure, however, the diaphragm cannot be depressed below its normal level, as it bears upon the lower plate $f^{10}$, which is held up on the stem $f^4$ by the yoke $f'$, pin $f^2$, and plug $f^3$ thereunder.

From the casing F the beer flows into the fount G through a side pipe $g$, connecting said casing with said fount and passed through one side of the case H. The fount consists, preferably, of a tin vessel of cylindrical shape, and is placed in the case H in such a way as to be surrounded and covered with ice, if desired, the case being made large enough and provided with a suitable metal lining $h$ for this purpose. The beer enters the fount through a lateral opening $g'$ near its upper end and comes out on the opposite side through a similar opening $g^2$ to be found a little above its bottom and into which is inserted the faucet J from the corresponding side of the ice-chest H, the course being indicated by the arrows in Fig. 1. Besides these openings $g'\ g^2$, through which the beer passes, the fount is further provided with a vent-hole in the center of its top $g^5$, which is made removable and is secured to the head by means of screws $g^6$ and thumb-nuts $g^7$, as shown. Small tubes $g^8\ g^9$ are inserted into this vent-hole, one from above, as at $g^3$, and the other from below, as at $g^4$, both forming a continuous passage, the ends of which are controlled by the two valves $i\ i'$, already referred to, and which are preferably united by a common stem $i^2$. To the lower valve $i'$ is attached a float I, which keeps the upper valve $i$ normally seated when the beer is low in the fount. This float is usually made of cork or glass and is of a weight calculated to seat the upper valve against a gas-pressure of, say, ten pounds or more. Beyond that pressure the gas may raise the valve $i$ and depending float and escape outside into the ice-chest through an air-hole $g^{10}$, made in the side of a hollow screw $g^{11}$, running into the end of a thimble $g^{12}$, the base of which is screwed into an annular flange $g^{13}$, formed on the upper side of the cover $g^5$ of the fount G; but when raised by the beer rising in the fount the float unseats the upper valve $i$ and seats instead the lower valve $i'$, thereby closing the vent-hole and preventing the escape of gas in that direction. The float is confined and guided in its vertical play within the fount by means of a yoke or stirrup composed of screw-threaded rods $g^{14}$, secured to the under side of the top $g^5$ and united at their lower ends by a cross-bar $g^{15}$, having a central hole through which a pin $i^3$, projecting from the bottom of the float, passes. This yoke with the float therein and other parts located beneath the cover $g^5$ are all inclosed within a shield or tubular casing K, secured to an under flange $g^{16}$ of said cover. Side holes $k$ are made in the sides of this casing in order to allow the gas in the fount to reach the vent-hole, and perforations $k'$ are likewise provided in its bottom, so that the beer may rise to the float.

The pressure in the fount is indicated by a gage L, connected therewith by a pipe $l'$ and placed on the outside of the case H, where it can readily be seen. This gage shows at a glance the state of the beer in the fount and enables one to regulate the pressure therein to suit. The regulating is done through the agency of the screw-cap $f^7$, which controls the tension of the spring $f^{11}$ upon the diaphragm $f^5$ in the upper part of the casing F in such a way as to close the valve $f$ and cut off the beer-supply from the moment the pressure in the fount has reached the limit determined upon, which is of course immediately indicated by the gage. The gage goes as the cap is screwed. Thus to break the pressure of the beer from the barrel and reduce it down to a thirty-pound pressure when run into the fount the cap $f^7$ is screwed up or down until the gage indicates "30." It is never necessary to regulate under thirty or thirty-five pounds, as the beer can be drawn nicely under that pressure at an ordinary temperature. The adjustment is done very quickly, and the beer can therefore be drawn soon after the connections between the barrel and the apparatus are made. The diaphragm, it will be understood, is raised by back pressure as soon as the same is sufficient to overcome the resistance offered by the spring under the cap, as determined by the gage, and operates to bring about a total or partial closure of the cut-off valve, according to circumstances, thereby stopping more or less tightly the discharge end of the pipe $e$ and reducing or checking, as the case may be, the flow of beer from the barrel for the time being or until the fount can vent itself through the automatically-operated valves and is relieved of part of its contents. Any tendency, then, of the pressure to increase in the fount above a given rate causes a proportionate upward movement of the diaphragm and cut-off valve and operates to diminish the area of the beer-passage in the same ratio. Contrariwise, a decrease in the pressure insures the fall of the diaphragm and valve and enlarges the area of the beer-passage. The pressure in the fount is therefore almost constant and is soon equalized through the automatic vent whenever disturbed. The effect of the automatic vent is to overcome an unnecessary amount of carbonic-acid gas which accumulates in the top of the fount. This gas, if not released, will cause the fount to become gas-bound, and when the drawing-off faucet is turned on there will be nothing but a gas escape. The cause of the gas accumulating is that the beer in the fount is put under a less pressure than in the barrel and releases the gas in proportion as the pressure is decreased. If the beer could be drawn from the fount at the same pressure under which it is in the barrel and the pressure or quantity were not kept back, there would be no necessity of venting the fount, as the gas could not separate from the beer so rapidly and in such volume as to fill the fount to the exclusion of the beer and close up the valves. On the other hand, if the pressure in the fount were decreased to almost nothing by loosening the spring on the diaphragm and quickening the action of the cut-off valve the gas would immediately leave the beer upon entering the fount, just as if it were in a glass, and cause the vent to be continually working while drawing through the faucet. The apparatus, it will be seen, can be regulated so that fermenting beer may be drawn through it from a barrel of one hundred pounds pressure or over as flat and with no more foam than water, or it can be regulated to draw sharp beer with as much of a foamy head as required. There are also other uses for the automatic vent. When the beer is first turned on, it allows all the air to leave the fount, and when the barrel is empty it allows the gas to escape until the gage drops to a set pressure, which shows that the barrel is empty before the fount itself has had time to be emptied. Connection may then be established at once with another barrel before emptying the fount, so the new beer will not strike the bottom of it. This prevents the yeast, which is an ingredient that accumulates in the fount to a certain extent, from "riling" or exciting the beer, thus keeping the beer perfectly clear. The upper valve $i$ acts as a blow-off. Its only use is to keep enough gas or pressure on the beer to keep it from becoming flat and souring when one barrel is emptied and another is not connected on at once. If the upper valve were not there when the barrel would empty itself, the float and under valve would drop and the gas from the barrel would pass through the fount and vent and leave the remainder of the beer in the fount without pressure. The result would be flat beer which would soon sour. Now if a higher pressure than thirty or thirty-five pounds is desired in the fount it can readily be had by screwing down the cap $f^7$, more and further compressing the spring upon the diaphragm, so the latter will withstand a greater back pressure. A high pressure in the fount is sometimes desirable, especially where it is wanted to serve extra sharp beer. Such is the construction of my improved apparatus that it allows the drawing of beer from the fount at an extraordinarily high pressure. Indeed, it has been found that with a judicious use of ice good and clear beer can be had out of the fount even at a pressure of sixty pounds. The working of the cut-off valve and the automatic vent are the same whether the pressure in the fount be high or low, and no matter what that pressure is the head of gas in the barrel is preserved, the same exerting its power up to the last and decreasing only as the barrel becomes empty. It is estimated that there still remains a pressure of thirty to thirty-five pounds in the barrel after it is emptied. The pressure is therefore amply sufficient to keep the beer sharp always and get the last drop of it out of the barrel, if desired. This, it is thought, is the only apparatus devised so far that can thus force the whole of the beer from a cellar—that is to say, without the use of pumps or special raising appliances. As the supply becomes exhausted the pressure drops down in the fount and is quickly indicated by the gage, which thus shows how soon a barrel should be replaced or connection established with another one, as already stated. This is a valuable and special feature of my improved apparatus.

The beer is drawn off the fount, as above mentioned, through the faucet J, which is what is termed a "high-pressure" faucet—that is, one adapted to draw the beer in a solid state at a comparatively high pressure, say at any pressure between ten and sixty pounds. This faucet has a plug $j$, movable vertically through the faucet-body. This plug is never turned when drawing the beer, but is slightly lifted or raised from its seat, so that the beer may flow out all around it and not come out in a full stream. The flow being thus divided allows a greater surface of the liquid to be aired, and the beer drops into the glass clear as water, with just enough foam in it to form a nice crown on top of the glass.

The operation of the apparatus, it will be observed, is simple and is readily understood by those using it, so that there is no occasion for its failing to work satisfactorily under ordinary circumstances. There is nothing in the apparatus to get out of order should a case arise when the working is not what it is expected to be and the ordinary attendant is unable to regulate it. In such case all the ordinary attendant is required to do is to stop the automatic vent by screwing down the hollow screw $g^{11}$, so as to close the air-hole $g^{10}$, and the apparatus will cease working until rearranged or reset by a person more familiar with its construction.

Fig. 4 illustrates a modification in the construction and relative arrangement of the valves $i\ i'$, controlling the vent-hole. As will be noticed, these two valves are disconnected in Fig. 4, whereas they are joined by a common stem in Fig. 1. Their functions remain, however, practically the same, the upper valve $i$ being seated on the upper end of the tube $g^8$ and the lower valve $i'$ finding a seat, when raised by the float I, on the lower end of the tube $g^9$; but in the modification the valve $i$ is permanently seated under normal conditions, being pressed down by a spiral spring $i^5$, coiled around its upwardly-running stem $f^4$ and confined between said valve and hollow screw $g^{11}$. This spring takes the place of the float I, the weight of which is depended on to keep down the valve $i$ in the other construction. The tension of said spring is regulated, as will be seen, by the screw $g^{11}$, and the greater such tension the more pressure will the valve stand; but the venting is effected automatically, as in the other case. By preference the air-hole $g^{10}$ in Fig. 4 is made in the side of the thimble $g^{12}$ rather than in the side of the screw $g^{11}$, as in Fig. 1. The float in Fig. 4 has its separate stem $i^6$, but in other respects is constructed and works as hereinbefore described.

The case H may be made large enough to contain several founts, if desired. On the other hand, two or more barrels can be connected with the same fount. By so doing the beer will be allowed to remain longer in each barrel while being drawn and given time to generate more gas, so that each barrel will empty itself at a higher pressure than if only one were tapped at a time. The two barrels then get emptied together.

The cover $g^5$ is purposely made of less diameter than the head of the fount, the intention being to lessen the extent of pressure from within on the removable part and thereby diminish the strain on its fastenings. Fewer screws are therefore required, both on account of reduced size and reduced strain, and the cover is more conveniently applied and removed. The kind of fastenings used for the cover also make it easier to put on and take off. Besides, one can handle it better if crowded for space, as is likely to be the case in many places, owing to the lay of the counters or stands where the apparatus is to be set up.

The apparatus as a whole is susceptible of much ornamentation and may be set up in any approved style. Thus, for instance, it can be put behind marble or finished with tile facing, as one's taste or fancy may direct.

What I claim, and desire to secure by Letters Patent of the United States, is—

1. An automatic regulator through which the fluid must pass, a fount to receive the liquid under pressure, and a float carrying a valve placed in the fount, combined with an outlet-pipe, a perforated inclosing case for the float, and a faucet for drawing off the fluid, substantially as described.

2. In an apparatus of the character described, the combination of a fount receiving steam-beer under pressure and provided with a vent-hole, valves adapted to control both sides of said hole, and a float actuating said valves, substantially as set forth.

3. An automatic regulator, a fount for receiving the fluid, under pressure, a float carrying two valves, and an outlet-pipe controlled by the two valves, combined with a perforated inclosing case for the float, a bell above the pipe, a valve for controlling the flow of gas from the bell, and a faucet for drawing off the fluid, substantially as specified.

4. The combination of a fount capable of receiving steam-beer, provided with an automatic valve for releasing part of the gas from the fount when the beer therein is below a certain level, means controlled by the beer for preventing the operation of the valve to release the gas after the beer has reached a certain level, a high-pressure faucet, and a regulator connected with the source of supply allowing the beer to flow into the fount while the faucet is opened, substantially as described.

In testimony whereof I affix my signature in presence of two witnesses.

SAMUEL H. ATCHISON. [L. S.]

Witnesses:
HENRY P. TRICOU,
A. H. STE. MARIE.